Dec. 30, 1930.  A. ABEL  1,787,333
LIGHT ADVERTISING DEVICE
Filed Oct. 26, 1929  2 Sheets-Sheet 2
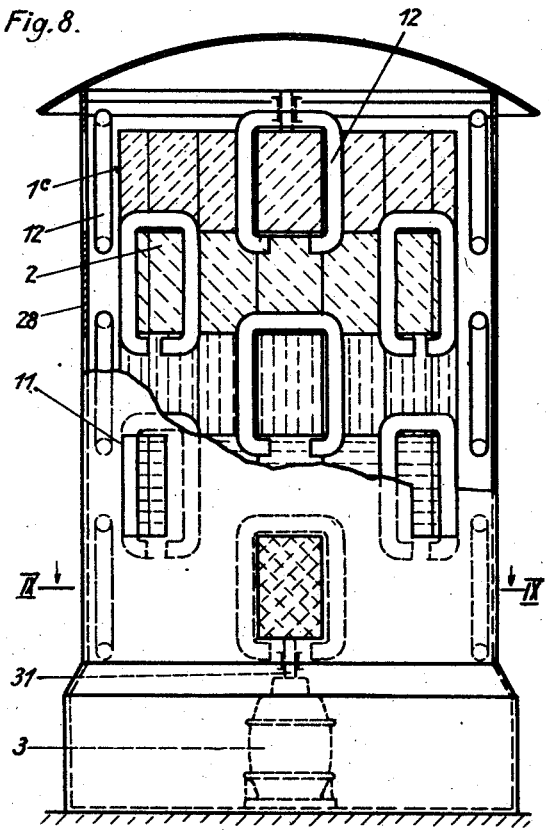
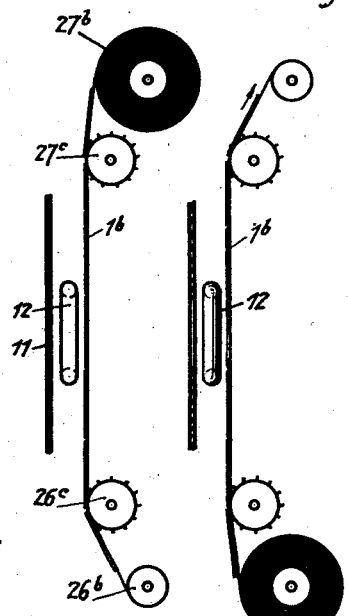
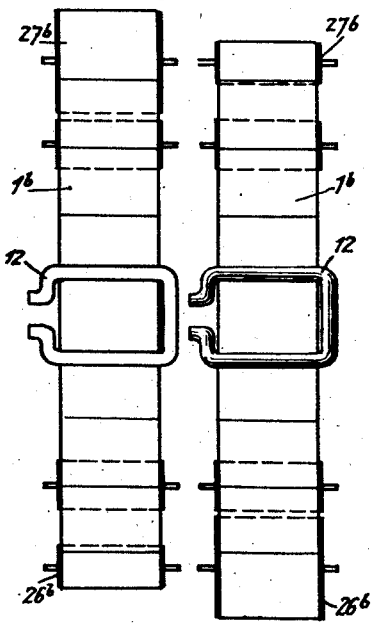
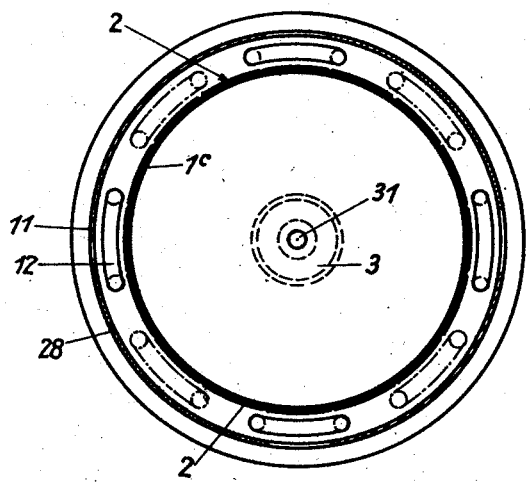
Inventor
AUGUST ABEL
By Dowell and Dowell
Attorneys.

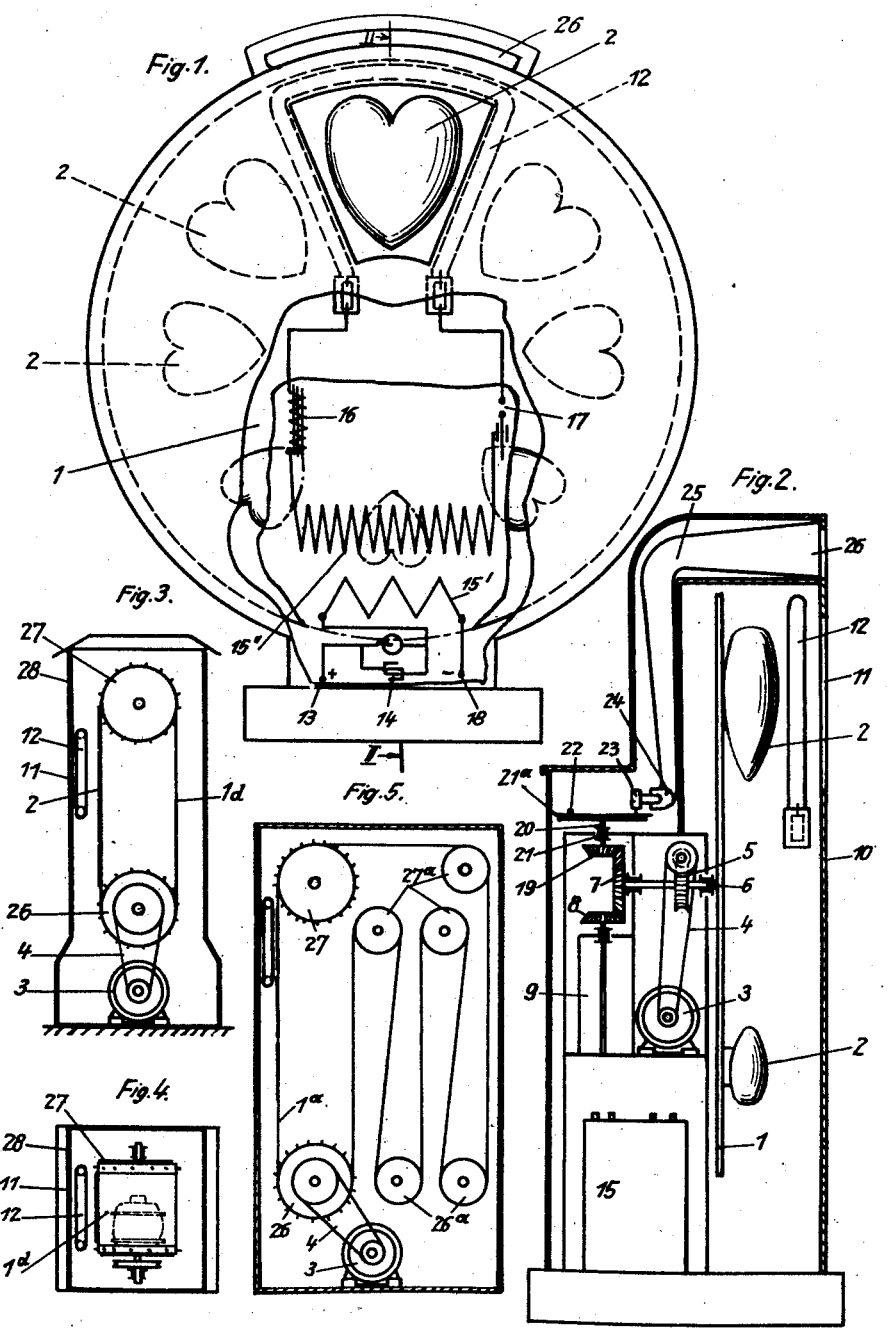

Patented Dec. 30, 1930

1,787,333

UNITED STATES PATENT OFFICE

AUGUST ABEL, OF LEIPZIG, GERMANY

LIGHT ADVERTISING DEVICE

Application filed October 26, 1929, Serial No. 402,673, and in Germany October 25, 1928.

This invention relates to devices for the production of apparently moving representations intended for use especially in advertising.

It provides a further development or improvement upon the method and apparatus forming the subject of my U. S. Patent No. 1,772,410 dated August 5, 1930, for method and device for producing stroboscopic light effects, wherein the effects are produced by a carrier movable at intermittently varied speeds in relation to a luminous field of constant frequency.

The apparent movement of the representations according to this invention is effected by optical illusion rather than by actual mechanical movement and the origin of this resides in the fact that the human eye is unable to follow quick changes of movement. The effects produced by these movable representations greatly surpass the effects obtainable by the ordinary cinematographic display of photographed or drawn trick films, inasmuch as it is possible to produce not only flat surface designs, but also colored, plastice and apparently moving representations of articles, animals, or even acting persons and to utilize the same for advertising purposes. By a simple connection of the device with a sound reproducing apparatus, natural representations in plastics, or acting and speaking persons in true colors may be produced, so as to present some advertised article, show its use and explain the same by spoken words.

The invention contemplates the employment of a carrier for the display matter, which may be of any suitable shape and may be divided into a number of equal sized sections or display fields containing, for example, the representations of one or more moving figures, the same being formed in plastics or in drawn, painted or otherwise produced surface designs, which may of course be colored. The various figures however should always represent the same article or the same person, and the individual figures should each show the same in some phase of movement, so that collectively or when exposed in rotation, the several figures will give the impression of successive movements of the article, or, in case of a person, of the different parts of his body. It is desirable to make the entire chain of figures form a complete cycle of movements, which may be repeated indefinitely without noticeable interlude or disjointment. Every section or field of the carrier may moreover contain representations of more than one article or person, so as to carry out different movements.

In order to obtain lifelike and natural representations in the various phases of movement, the consecutive movements are preferably carried out by living persons cinematographed while performing. The individual photos thus taken may then be enlarged and reproduced in painting plaster of Paris, papeir-mâché or some other plastic substance, to be finally arranged in proper order and position upon the carrier.

In similar manner it is possible to produce advertising representations for display with the effect of the well-known trick films, the same being formed as surface designs either in black and white or colored, or in plain or colored plastic representations. In this way, very effective and, to the noninformed, almost inexplainable effects can be produced. It will be obvious that surface and plastic designs may be combined in any desirable manner. Thus for example, the back ground of some of the display may be painted, while the foreground or main-material parts such as figures or moving articles, or both, may be made of plastic configuration.

These "carriers", by which term the movable bodies with surface designs or plastic representations of successive phases of movement will be referred to hereinafter, may be made in any convenient form or shape. They may be in the form of revoluble bodies, such as disks, cylinders and the like, or in the form of travelling bodies such as bands, aprons, or the like. As before stated, the individual figures may be painted, printed or otherwise applied to the sections or fields of such bodies, or may be fixed thereto in any appropriate manner, their arrangement of course being in the correct successive relation. The carrier so provided with the desired display matter is then moved within a luminous field by means contemplated by this invention and said field is produced by short individual flashes of light as hereinafter described. Special means are provided to cause the light flashes always to occur at the correct and timed intervals, or in other words, whenever the carrier has moved by the amount of one field or section of individual representation.

In order to create the appearance of well defined representations in spite of or without regard to the movement of the carrier, the light flashes must be of very short duration, and as these flashes follow each other at very short intervals according to the movement of the carrier, the observer will have the impression that all the individual figures or pictures are moving, provided the same are all illuminated simultaneously by the said light flashes. However, if only one of the moving representations is to be shown, the others must be concealed from view by a screen, partition or the like. In such case, the screen or partition should have an opening therein of approximately the size of the individual sections or display fields of the carrier, so as to allow only one of the same with its representation to be visible at a time to the observer. In such arrangement of course only the representation visible through the opening need be illuminated by the light flashes.

The short flashes for illuminating the representations on the movable carrier and which are caused to occur at constant predetermined intervals, may be produced in various ways.

For example, the intermittent luminous field produced by these light flashes may be effected through luminous tubes of the so-called "gas-discharge" type, such as neon or Moore tubes, which are particularly suited to the purpose because of their inertialess electric discharges in gaseous mediæ. It is advisable to keep the characteristic of the electric current (either alternating or interrupted direct current) as sharply defined as possible, in order to obtain light flashes of exceedingly short duration and thereby make possible the production of very clear outlines. In order to produce a light flash each time the continuously moving carrier moves the extent of one of its display fields or sections, said carrier is connected to a contact device of any known and convenient kind, or as an alternative, the edge of the carrier itself may be so formed that after every movement for the extent of a field, the primary direct current of the transformer used for feeding the gas discharge tubes is interrupted. If, for example, a rotary mercury interrupter is employed, the same may be clutched directly to the driving electromotor for the carrier, while the carrier itself may be driven through interconnecting reduction gears. Assuming a disc-shaped carrier having 20 sections or display fields with 20 individual representations, the reduction in the power transmission between the motor and the interrupter, which effects one interruption for every rotation of the carrier, would be 20 to 1, in order to produce one flash with every movement of the carrier for the extent of one field.

It will be understood that the electrical and mechanical arrangement of the device of this invention is of no especial importance and may be varied according to circumstances or will. It is important however that the light flashes shall be of as short duration as possible and that they illuminate the carrier always at the proper moment and in the correct sequence or intervals of time.

In the accompanying drawings several modifications of the invention are illustrated by way of example.

Fig. 1 represents a simple form of device with a disc-shaped carrier in front elevation partly broken away;

Fig. 2 is a sectional side elevation thereof taken on line 2—2 of Fig. 1;

Fig. 3 is an elevation of a modified form of device having an endless band or belt carrier;

Fig. 4 is a plan view of the modified form with the top of the casing removed;

Fig. 5 illustrates a further modification wherein an endless band-shaped carrier is extended by the arrangement of several guide rollers to provide for a prolonged display of representations;

Fig. 6 is a side elevational representation of an arrangement of two juxtaposed non-endless bands or belts adapted for alternate function, with one winding up while the other is displaying;

Fig. 7 is a front elevation of the last mentioned arrangement;

Fig. 8 is a partly broken away elevation of another modification in which the carrier is of cylindrical form; and Fig. 9 is a sectional plan view of the latter, taken on line 9—9 thereof.

Describing first the form of Fig. 1, the carrier 1 in the simplest form of a disc is shown arranged within a casing completely concealing the same from view except through a single window opening at the front. This carrier, as already stated, bears the matter or representations for display in advertising. Assuming for example, that it is desired to advertise a brand of coffee which does not affect the heart, a simulation of the action or beating of that organ may be brought about by arranging a number of representations of a heart upon the carrier within its display fields or sections to be visible one at a time through the window opening in the casing. These representations may be of a hardened plastic substance colored red for realistic appearance and should be of size increasing and decreasing sequentially around the disc.

In this instance, the carrier is divided into eight sections or fields of equal size, having the representation of a heart 2 in each, said representations being of different sizes to simulate different phases of the living organ's action. These phases represented by the eight different sized hearts might of course be represented by many more or even less of the symbolic article as preferred and other objects, persons or things may of course be similarly illustrated in their movements. The eight plastic hearts here representing eight phases of heart muscular contraction are arranged upon the carrier in ascending and then descending succession from diametrically opposite points. Instead of full plastic representations, these hearts may be painted or drawn in relief only, or may be merely plain colored pictures, whichever is preferred, as the formation of the representation itself is not the subject of the invention.

The aforesaid carrier is mounted for rotation within its casing and when rotated at appropriate speed, accompanied by light flashes at intervals of movement for the extent of one display field or section before the casing window, the eight hearts will appear as one contracting and expanding in a beating action like the real organ. With rapid rotation and timed light flashes so frequent as not to be perceptible as other than continuous illumination, the device thus gives a vivid impression of the real heart action. By way of contrasting normal heart beating with that under the influence of a propagated or injurious coffee, the simulation of a quick heart beat may be produced by simply increasing the rotational speed of the driving motor by any suitable and preferably automatic means.

If the carrier is exposed so that the several different sized hearts or other representations are visible simultaneously and the illumination by short light flashes is made to occur at the proper moments, then all the hearts will appear to beat at the same time. But when only one is visible at a time as in this instance, there will appear to be only one beating heart. As already stated, the front cover 10 of the carrier casing screens all but one from view, and this one is visible through a window opening 11 therein of a size corresponding to that of one of the display fields or sections of the carrier. The light flashes take place as the several representations sequentially reach a position centrally of and behind said opening. It is therefore necessary to illuminate only one representation at a time at this point.

As shown in Fig. 2, the carrier is driven by an electric motor 3 through a belt 4 travelling over one of a pair of intermediate reduction gears 5 giving reduced rotation to the shaft 6 on which the carrier is mounted. On the other end of said shaft is a bevel gear 7 meshing with a like gear 8 to drive a circuit interrupter of any convenient kind, as for example, a mercury interrupter diagrammatically represented at 9.

Every time one of the representations on the carrier appears in the center of the window opening (11), a short flash of light is made to occur through the inertialess source of light, which in this instance, comprises a luminous tube 12, such as a neon or Moore tube, fixed behind said opening. It will of course be obvious that translucent rather than plastic, or other nontransparent forms of representations may be applied to the carrier, in which case the tube 12 would be arranged behind the carrier opposite the window opening in its casing.

The electric outfit of the device consists in the aforementioned rotary mercury interrupter 9, which is supplied with direct current from the positive terminal or connection 13 (see Fig. 1) and with which a condenser 14 is connected in parallel for the purpose of subduing the interrupter spark and reducing its duration. The circuit includes a transformer 15 through the primary coil 15' of which the current is directed from said interrupter, whence it passes to the negative terminal or connection 18. One end of the secondary winding 15'' of the transformer passes over a choke coil 16 to the luminous tube 12 from whence the current is led over an adjustable spark-gap 17 to the other end of said secondary winding.

The driving relation between the shaft 6 of the carrier and the interrupter 9 is such as to momentarily make and break the primary circuit of the transformer at the moment a representation appears in the observation window of the casing. However, only a strong opening spark is employed for the momentary illumination of the picture by means of the luminous tubes.

The effect or result to be produced and the length or extent of display desired will of course determine the form or shape and size of carrier to be used. The locality and other conditions may also govern this determination. In this connection however, it should be emphasized that as distinguished from common "flashing" incandescent-lamp advertisements in which groups of lamps are cut in and out of circuit for the imitation of motion with only a jerky and unnatural effect, this invention provides for the imitation of motion and the reproduction of coloring in exceptionally natural and life-like manner, the same being furthered by the employment of photographic or cinematographic pictures, colored reliefs, or realistic plastic representations. It is moreover immaterial whether a simple or complicated movement is to be imitated, or whether it is to be of only one or several objects simultaneously. In all cases, the represented movements will be smooth, regular and continuous in appearance.

It is also possible to reproduce appropriate sound in accompaniment with the apparent movement of the representations. For example, a girl might be represented in demonstration of some toilette article and therewith a spoken explanation reproduced with effect as if she were herself doing the speaking. To make this possible, it is necessary only to drive a sound reproducing device from the means for driving the carrier. A perfectly synchronized effect may be obtained by taking a cinematographic picture simultaneously with word accompaniment and applying the pictures sequentially (in enlargements or not as desired) to the carrier. These cinematographic or picture reproductions might be made in colored plastics or in other materials and forms. When so placed on the carrier and the latter driven in synchronization with the sound reproduction, as by a gramophone record, film record or the like, the result will be much the same as "sound film" or movietone production.

A simple arrangement for sound production as above described is shown in Fig. 2. The aforementioned bevel gear 7 engages another gear 19 on a shaft 20 which is journaled in a bearing 21 supported in the carrier casing. Said shaft 20 provides the spindle of a holder-disc 21ª for a gramophone record. The correct position of the record thereon may be fixed by means of a pin 22 extending through a hole in the record at its edge as in the center. The sound cuttings in the record are translated into sound in the usual way through a sound-box 23, movable tone-arm 24 and amplifying horn 25 opening to the mouth 26 at the top of the carrier casing. In this way, perfect synchronism between the optical and the acoustic performance is assured.

Referring now to Figs. 3 and 4, an endless band or belt carrier 1ᵈ is shown employed in place of the disc carrier of the first described form. This band-carrier may be divided for example into sixteen display fields or sections, each containing the desired representations in successive order. These are preferably colored as in the foregoing example and may be applied to the band in any convenient manner. Said band may consist of steel or other flexible material and may function as an endless chain by providing drive perforations along both side edges. The drive is effected through an electric motor 3 having a belt 4 travelling over a sprocket-like wheel 26 with duplicate 27 thereof arranged above. In the casing 28 of this modification, the window opening 11 is provided, behind which a rectangularly bent luminous tube 12 is arranged, with electrical connections as already described.

In the modification of Fig. 5, an endless belt 1ª is guided up and down over a series of rollers 26ª and 27ª in order to provide for a longer carrier with greater number of individual representation fields or sections, affording a prolonged display.

The duration of display may be still further increased if a non-endless band or belt is employed, as diagrammatically shown for example in Figs. 6 and 7. In the latter arrangement, the band 1ᵇ is unwound from a roller 27ᵇ onto another roller 26ᵇ at its other end. The feed is effected by the sprocket-like wheels 27ᶜ and 26ᶜ as in the modifications of Figs. 3, 4 and 5 and the illumination the same as in those figures. It may be advantageous to arrange two of these side by side and to drive the same so that one will wind up for repeated display while the other is unwinding in display. During display of course, the one is illuminated while the other is not, as illustrated by the darkened tube in this modification. In practice, the bands would probably be arranged side by side, but in Fig. 6 they are shown one behind the other in order to permit better illustration. In this figure, the band at the left is unwinding downwardly and illuminated by its associated tube 12, while that on the right is winding upwardly as indicated by the arrow, and its illuminating tube 12 darkened during the time as represented by the shading of the latter. In this way an uninterrupted display of representations is made possible. The mechanism for effecting the alternate display by reverse winding and current switching may be of any applicate construction such as would occur to any mechanic, and as it forms no part of the invention per se, has not been illustrated.

Winding and unwinding carriers such as shown in Figs. 6 and 7 naturally are unsuited to other than flat pictures, drawn or translucent designs, but where it is desired to use plastic representations according to the same principle, endless belts such as shown in Fig. 5 will be found well adaptable to the purpose. On the other hand, the winding and unwinding bands present the possibility of producing comparatively long and sequential displays.

In the modification of Figs. 8 and 9 the carried is in the form of a vertically rotating cylinder 1c having its shaft 31 driven by the electric motor 3. This cylindrically-shaped carrier may have several rows of representations of successive movements as shown, there being five in the present instance. These are arranged one above the other and each consists of sixteen individual display fields or sections. For the sake of clearness, the five superposed groups of representations are distinguished from one another by dotted-line shading in Fig. 8, wherein the outer shell 28 of the cylinder is shown partly broken away. It will be appreciated that by means of this device, a large number of advertising displays can be shown at a time or separately, which is a great advantage.

The illumination of the several sets or series of representations is accomplished by light flashes as in the other forms of the device. A further advantage resides in the fact that the representations may be viewed from more than one side by simply providing additional window-openings and illuminating tubes around the circumference of the cylinder, as represented in the aforesaid Figs. 8 and 9. The device as here shown is constructed in the shape of a kiosk and the cylindrical shell or wall encircling the cylinder is provided with several observation windows at different points, through which the various representations may be viewed. For each level of display, four of such windows are arranged at quadrant points around the shell, all for each level being of course at the same height. As five sets or series of representations are provided in the illustrative construction, the entire kiosk therefore contains 20 windows, which are preferably arranged in staggered relation because of the space required for the rectangularly shaped luminous tubes 12 placed therebehind. By such arrangement of the windows, several different representations may be viewed at the same time and from different positions around the kiosk, so that the device constitutes an advertising pillar for the simultaneous showing of a plurality of advertising displays.

Obviously, the several illustrated modifications of the device or parts thereof may be combined and worked in conjunction with a sound reproducing apparatus as described with reference to Figs. 1 and 2. In the case of a kiosk construction, where sound reproduction is to be used, it may be advisable to illuminate and show only one of the displays at a time. Each display may then have its appropriate sound accompaniment, which when terminated, will be followed by the next display above or below.

From the foregoing it will be seen that the invention provides for complete optic-acoustic displays which will be natural and regular in appearance, color, movements and sound accompaniment. In the case of cinematographic pictures with which acoustic records are now easily taken simultaneously, it will be evident that the reproduction will be particularly realistic and natural. By the use of plastic representations moreover, very natural reproductions of living persons and their movements may be obtained with accompaniment speech, so that the invention may be said to solve the problem of artificially reproducing living beings almost perfectly true to nature. It will be appreciated that the invention may be employed in many different ways for the described purpose of producing optic and optic-acoustic advertisements, although it may of course be equally well adaptable to entertainments and educational exhibits.

Having thus described my invention, what I claim as new and desire to secure by Letters Patent of the United States is:—

1. In a device for the production of apparently moving display matter, means for causing an instantaneous short flash of illuminating light upon representations moved by a carrier to a point of observation; said means comprising a luminous gas-discharge tube connected in an electric circuit including a current interrupter synchronized with the carrier to permit momentary energization of the tube at predetermined regular intervals, a condenser connected in parallel with the interrupter for subduing the spark and reducing its duration, and a transformer having a choke-coil and adjustable spark gap in the circuit of its secondary winding.

2. A device according to claim 1 wherein the means for energizing the luminous tube functions to cause the occurrence of a light flash with every partial movement of the carrier for the extent of one representation thereon.

3. A device according to claim 1 wherein the interrupter permitting energization of the luminous tube for lighting up the representations embodies a rotary element driven by the means for driving the carrier.

4. A device according to claim 1 wherein the carrier for the representations is concealed by a screen having an opening through which the same may be viewed as they are consecutively moved and momentarily illuminated therebefore.

5. In a device according to claim 1, the combination of a sound reproducing device having means for operating the same from the means for driving the carrier so that the sound will be synchronized with the apparent movement of the representations thereon.

In testimony whereof I affix my signature.

AUGUST ABEL.